G. S. MASKO.
VEHICLE SIGNAL.
APPLICATION FILED NOV. 27, 1917.
1,321,320.
Patented Nov. 11, 1919.
2 SHEETS—SHEET 1.
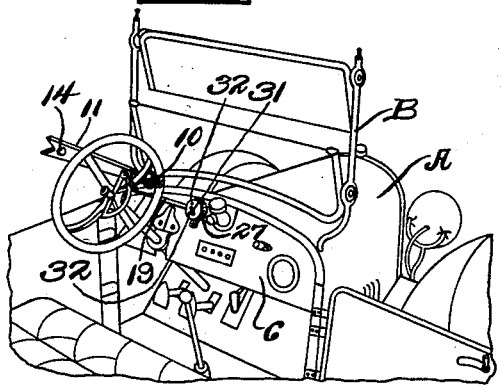
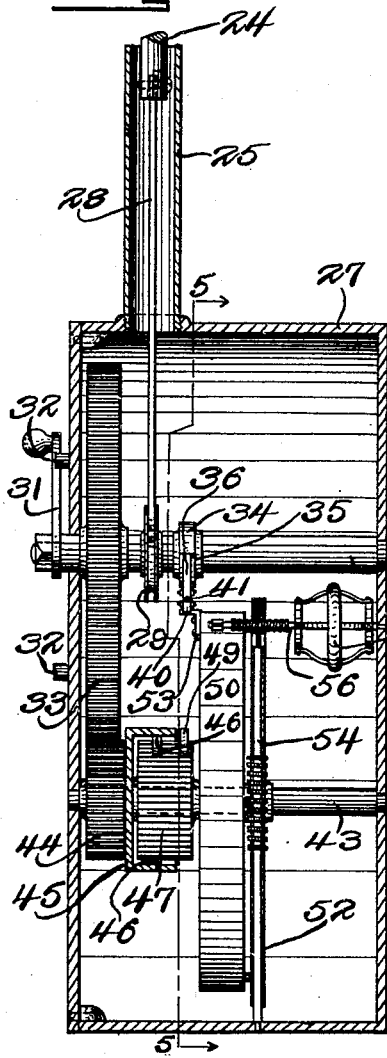
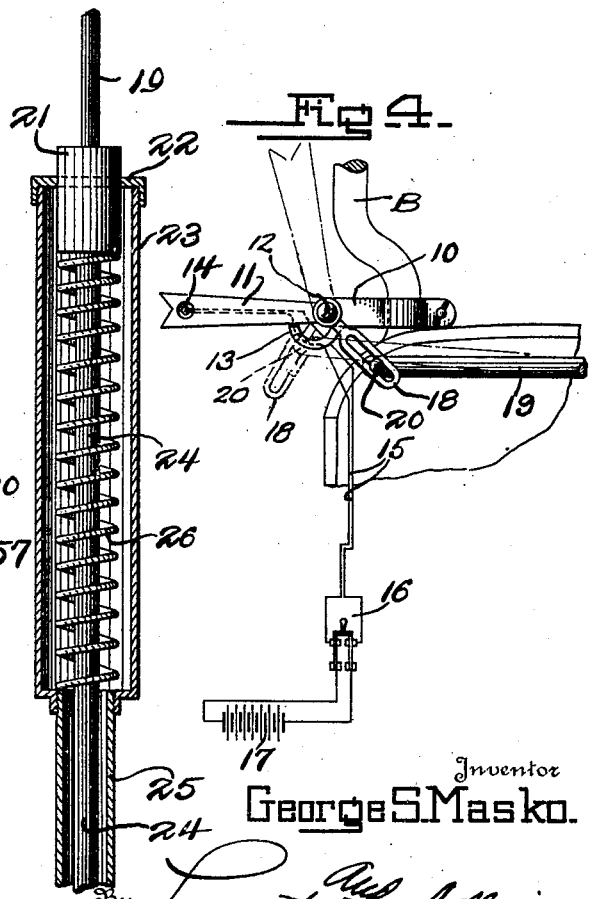
Inventor
George S. Masko.
By Lancaster and A. Alwine
his Attorneys G. S. MASKO.
VEHICLE SIGNAL.
APPLICATION FILED NOV. 27, 1917.
1,321,320.
Patented Nov. 11, 1919.
2 SHEETS—SHEET 2.
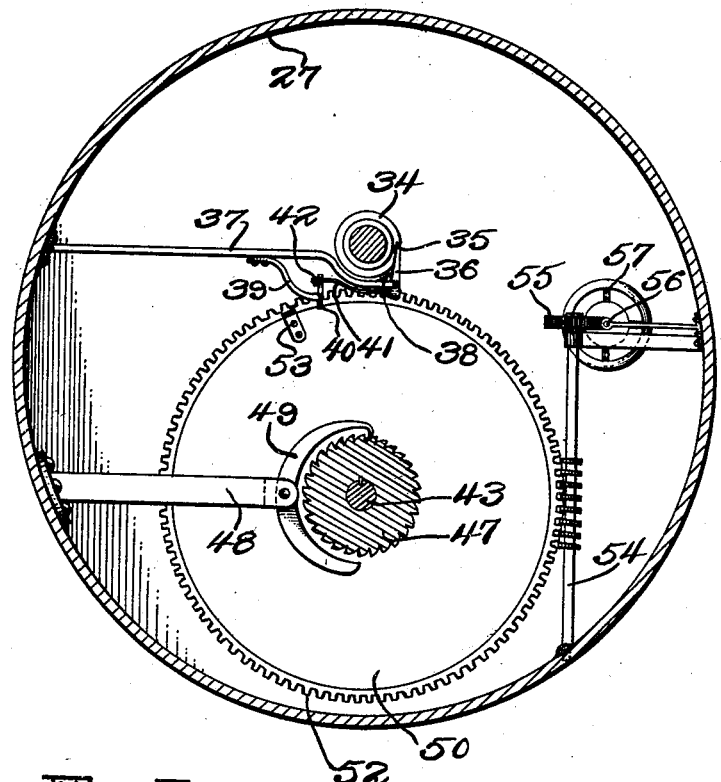
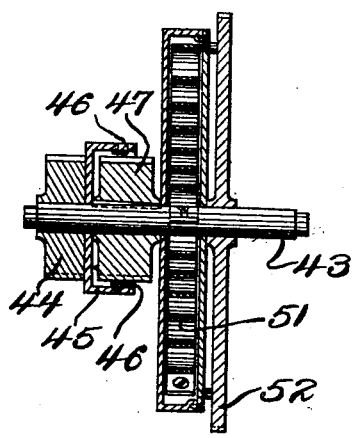
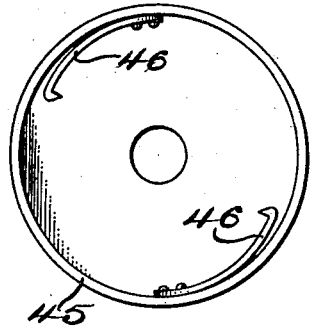
Inventor
George S. Masko.
By Lancaster and Allwine
his Attorneys

UNITED STATES PATENT OFFICE.

GEORGE S. MASKO, OF SEATTLE, WASHINGTON.

VEHICLE-SIGNAL.

1,321,320.

Specification of Letters Patent. Patented Nov. 11, 1919.

Application filed November 27, 1917. Serial No. 204,223.

*To all whom it may concern:*

Be it known that I, GEORGE S. MASKO, a citizen of the United States, and a resident of Seattle, in the county of King and State of Washington, have invented certain new and useful Improvements in Vehicle-Signals, of which the following is a specification.

The present invention relates to signals, and more particularly to that class adapted for use on motor vehicles, and the like, for giving directions as to the proposed course to be pursued by the operator.

The invention has for an object to provide a signal device of this character which comprises relatively few parts; which may be easily applied to the wind shield or frame of the motor vehicle; which is provided with mechanical means for raising and lowering the signal arm; which is provided with a manually actuated device for controlling the operation of said mechanical means, and which requires no definite extent of operation or the exercise of skill and care in setting and releasing the mechanical means; and which comprises a construction wherein the signal may be located at the desired place upon the vehicle, and the operating and controlling means may be positioned at any other suitable point remote from the signal arm upon the vehicle body.

The invention also embodies certain other important features which will be hereinafter described, and particularly understood, in the detailed description of the present preferred embodiment, the same being illustrated in the accompanying drawings, wherein:

Figure 1 is a fragmentary perspective view of a motor vehicle having a signal device constructed according to this invention applied thereto.

Fig. 2 is a horizontal section taken through the operating mechanism, parts of the same being shown in elevation.

Fig. 3 is a horizontal section of the connecting means which is arranged between the operating mechanism and the signal arm.

Fig. 4 is a side elevation of the signal arm and its support, showing the parts adjacent the signal arm for operating the same.

Fig. 5 is a longitudinal section through the operative mechanism taken on a plane indicated by the line 5—5 in Fig. 2.

Fig. 6 is a fragmentary sectional view taken through the spring and adjacent parts of the operating mechanism.

Fig. 7 is a side elevation, enlarged, of the pole support employed in winding the spring of the mechanism.

Referring to these drawings, A designates the body of a vehicle provided with a wind shield B and an instrument board C.

As shown in detail in Fig. 4, the wind shield B has clamped thereto a bracket 10 upon the outer end of which is mounted a signal arm 11 by means of a pivot pin 12. The signal arm 11 is adapted to be normally held in an upwardly extending position, as shown in dotted lines in Fig. 4, and is adapted to be moved down into the position shown in full lines in Fig. 4 and engage a rest or stop 13. The rest or stop 13 is in the form of a projection extending from the bracket 10 and adapted to support the arm 11 in outwardly extended horizontal position. An electric lamp 14 is arranged in the outer end of the arm 11 and is connected by wires 15 and a switch 16 to a battery 17 or other suitable source of current. One of the wires 15 terminates in the arm 11 and the latter comprises a contact in the circuit. The other portion of the wire 15 extends through the signal arm 11 to the lamp 14 and emerges from the arm 11 at a point adapted to engage the support 13 to complete the circuit when the arm 11 is swung outwardly. The arm 11 is provided upon its inner pivoted end with a depending ear 18 to which is connected a longitudinally reciprocable rod 19, by means of a pin 20. The rod 19 extends a short distance inwardly from the signal arm 11 and is provided with a head or enlargement 21 adapted to fit for sliding movement through a cap 22 which is secured upon the outer end of a cylinder 23. The head 21 is relatively short, and is provided with a stem 24 extending longitudinally through the cylinder 23 and into a tube 25 which is connected to and extends longitudinally from the cylinder 23. A helical spring 26 surrounds the stem 24 within the cylinder 23 and bears at one end against the inner end of the cylinder 23 and at its opposite end against the head 21 to normally urge the latter toward the signal arm and thus sustain the arm in raised position.

The inner end of the tube 25 opens into a casing 27 within which the timing and operating mechanism is located. The stem 24 terminates in spaced relation from the casing 27 and is secured to one end of a flexible element 28, such as a belt or cable, and the other end of the flexible element 28 is secured to the peripheral portion of a pulley 29 fixed upon a shaft 30 which is journaled in opposite sides of the frame 27. The shaft 30 is provided with a crank handle 31 upon its forward end, the handle 31 being arranged exteriorly of the casing and adapted to be grasped by hand for turning the shaft. An adjustable stop pin 32 is preferably fixed in the front wall of the casing in the path of the arm 31 to limit the turning movement of the same. The shaft 30 is also provided with a relatively large spur gear wheel 33 fixed to the shaft to turn therewith, and is also provided with a stop wheel or disk 34 provided with a ratchet notch 35 in its periphery and at one side, and within which is adapted to engage a dog 36 pivotally supported intermediate its ends upon a post 37 projecting from an adjacent side portion of the frame 27. A spring 38 is connected at opposite ends to the dog 36 and the bracket arm 37 to urge the dog into the notch 35 when the disk 34 is turned to register the notch with the free end of the dog.

The bracket 37 is provided with a laterally extending arm 39 upon the outer end of which is pivotally mounted a rocking lever 40 having one end connected to the inner extremity of the dog 36 by a link 41. The link 41 is pivotally connected to the dog 36 at one end and extends in an opening in the adjacent end of the lever 40 and is adapted for movement therewith in one direction by means of an adjustable nut 42 arranged upon the free end of the link and against the under side of the lever 40. When the free end of the lever 40 is swung upwardly, the link 38 is drawn down and the dog 36 is raised out of the notch 35 of the disk. The spring 26 in the cylinder 23 urges the shaft 30 and the disk 34 to turn in one direction.

Timed mechanism is employed for releasing the dog 36 from the shaft 30, the mechanism comprising a shaft 43 journaled in the sides of the frame 27 and arranged substantially in parallelism with the shaft 30. Fixed upon the shaft 43 is a pinion 44 arranged to intermesh with the gear wheel 33. The pinion 44 is provided with a cup-shaped support 45 secured to the inner side of the pinion 44 and provided therein with preferably a pair of diametrically opposed spring pawls 46 normally urged inward for interlocking engagement with a ratchet wheel 47 which is keyed to the shaft 43 to turn therewith. A post 48 rises from the lower side of the casing 27 and has pivotally mounted in its upper end a plated pawl 49 the nose of which is adapted to engage with the ratchet wheel 47 and retain the latter from retrograde movement. Mounted to turn upon the shaft 43 is a spring casing 50 in which is placed a coil spring 51 having one end secured to the casing 50 and its opposite end secured to the shaft 43. A gear wheel 52 is secured to the outer side of the casing 50 to turn therewith and is mounted to turn upon the shaft 43. The casing 50 is provided at one side with a radially extending projection or trip 53 adapted to strike the free end portion of the rocking lever 40.

For the purpose of checking the rotation of the casing 50 when the spring 51 is wound, the gear wheel 52 meshes with a shaft 54 having a worm thereon meshing with the gear wheel 52, the shaft 54 having a worm wheel 55 upon one end meshing with the worm of a governor shaft 56 upon which a governor 57 is mounted. The governor 57 is adapted to check the rotation of the casing, and the gear wheels in the train of gear between the casing and the governor are proportioned to the desired size for checking the rotation of the casing 50 in the desired time intervals.

The casing 27 with its tube 25 and cylinder 23, is mounted upon the instrument board C within easy access of the operator. Normally, the spring 24 holds the signal arm 11 in raised position. When it is desired to operate the signal arm and indicate that the operator is to make a turn or stop, it is only necessary for the operator to grasp the crank handle 31 and turn it a half revolution, from one stop 32 to the opposite stop. When the handle 31 is turned, the shaft 30 is rotated therewith and the intermeshing gears 33 and 44 are actuated to turn the shaft 43. The shaft 43 is turned by interlocking engagement of the pawl 46 with the ratchet wheel 47, quickly winding the spring 51. The governor 57 checks the rotation of the casing 50 and prevents the same from unwinding the spring to follow the rotation of the shaft. The operator releases the handle 31. When the shaft 30 is thus turned, the pulley 29 mounted on the shaft is also turned and wraps the belt about the pulley to draw the stem 24 toward the casing 27 and compress the spring 26. This operation moves the head 21 through the cap 22 of the cylinder 23 and swings the signal arm 11 down into a horizontal position. At night, the switch 16 is closed so that when the arm 11 is swung down, a circuit is closed through the support 13 and the circuit wires to light the lamp 14. The casing 50 is turned under the tension of the spring 51 at the desired speed, and when it completes substantially a full turn or revolution, the trip 53 strikes the rocking lever 40 and releases the dog 36 from the disk 34. The turning of the shaft 30 also rotates the disk 34 so that when the arm 11 is drawn into its lowered position, the dog 36 drops into the notch 35 of the disk and retains the arm in such position. As soon as the dog 36 is released from the disk, the spring 26 draws the stem 24 outwardly from the casing 27 and turns the shaft 30 in a reversed direction. The crank arm 31 is thus turned to initial position, the signal arm 11 is raised automatically into an inert position after the lapse of a predetermined time.

The belt 28 may be of any desired length and may extend to any part of the vehicle where the operating and timing mechanism is located. For the purpose of operating the signal, it is only necessary, on the part of the operator, to swing the crank arm 31 from normal position against one of the stops 32 into position against the opposite stop. This movement imparts the desired number of rotations to the shaft 43 for winding the spring 51 and obtaining the desired tension; to swing the signal arm 11 down into an operative position, and to interlock the disk 34 with the dog 36. The signal arm 11 thus remains down until the governor controlled casing 50 turns sufficiently to bring the stop trip 53 into contact with the lever 40.

It is of course understood that various changes and modifications may be made in the details of construction and design of the above specifically described embodiment of this invention without departing from the spirit thereof, such changes and modifications being limited only by the scope of the following claims.

I claim:

1. In a signal, the combination of a bracket, an arm pivoted to the bracket, means for retaining the arm in inert position, manually controlled operating means for lowering the arm to indicating position, means for interlocking the arm in lowered position, and a time controlled releasing mechanism adapted to free said arm.

2. In a signal, the combination of a movable signal element, means for normally retaining the element in inert position, means for moving the element into operative position, means for locking the element in operative position, and a time controlled releasing device adapted to free the arm and admit its return to inert position.

3. In a signal, the combination of a support, a signal arm movably mounted on the support, means for normally retaining the element in inoperative position, said element adapted to be manually drawn down to indicating position, means for locking the element in indicating position, and a time controlled trip adapted to engage the interlocking means and free the element.

4. In a signal, the combination of a bracket, an arm pivoted to the bracket, operating means connected to the arm for normally maintaining the same raised, a manually controlled device connected to the arm for lowering the same, locking means for retaining the arm in lowered position, a spring controlled mechanism associated with said manually controlled device and adapted to be wound upon operation thereof, and a governor connected to the spring controlled mechanism for timing the operation thereof.

5. In a signal, the combination of an indicating element, means for normally retaining said element in inoperative position, a manually controlled device connected to the element for moving the same into indicating position, locking means adapted to retain the signal element in indicating position when lowered, a spring controlled trip adapted to release the locking means, and a connection between the spring and said manually operated means for winding the spring when said element is moved into indicating position.

6. In a signal, the combination of a signal element, a rod connected to the element, a spring connected to the rod to normally urge the same in one direction for moving the element into inoperative position, a spring motor, a manually controlled device connected to the motor for winding the same, a connection between said rod and said device for moving the element into operative position and simultaneously winding the motor, means for locking the manually controlled device in position to retain the element in indicating position, and a trip mounted upon the spring controlled mechanism and adapted to release said signal element upon the lapse of a predetermined length of time.

7. In a signal, the combination of a pivoted signal element, a spring connected to the element to normally urge it into inoperative position, means for manually moving the element against said spring into operative position, means for locking the element in operative position, a spring motor, a connection between the motor and said means for winding the motor when moving the element into operative position, releasing means connected to the motor adapted to release said device to free the indicating element and controlling means connected to the motor for restricting the speed of rotation thereof.

8. In a signal, the combination of a signal element, means engaging the element to normally maintain it in inoperative position, a manually operable device connected to the element to move the same into operative position, a time controlled motor, a connection between the motor and said manually operable device for winding the motor simultaneously with the adjustment of the element into operative position, a lock for the element to maintain it in operative position, and releasing means carried by the motor adapted to release the element subsequent to a predetermined time interval.

9. In a signal, the combination of a signal element, a rod connected to the element, a spring connected to said rod to normally urge it in one direction for moving the signal element into inoperative position, a spring motor, a manually controlled device connected to the motor for winding the same and a connection between said rod and said manually controlled device for moving the signal element into operative position and simultaneously winding the motor.

GEORGE S. MASKO.

Copies of this patent may be obtained for five cents each, by addressing the "Commissioner of Patents, Washington, D. C."